Patented July 30, 1940

2,209,716

UNITED STATES PATENT OFFICE 2,209,716

METHOD OF PRESERVING COATED ABRASIVES

Frank J. Crupi, Troy, N. Y., assignor to Behr-Manning Corporation, Troy, N. Y., a corporation of Massachusetts No Drawing. Application December 27, 1938, Serial No. 247,829

1 Claim. (Cl. 51—281)

The invention relates to coated abrasives and involves a method of preserving them from deterioration, and with regard to its specific features to preserving silicate bonded coated abrasives and waterproof sandpaper.

One object of the invention is to provide a facile method for the preservation of waterproof sandpaper. Another object of the invention is to provide a facile method for the preservation of silicate bonded coated abrasives. Another object of the invention is to provide a method of the type indicated which will not interfere with transportation of the abrasive in roll form or storage thereof under varying conditions. Another object of the invention is to provide a method which is applicable alike to cut sheets, to discs, and to coated abrasives in rolls. Another object of the invention is to protect coated abrasives from chemical action of the air, especially those which are susceptible to oxidation or to reaction with carbon dioxide. Other objects will be in part obvious or in part pointed out hereinafter.

The invention accordingly consists in the several steps and relation and order of each of said steps to one or more of the others thereof, all as will be illustratively described herein, and the scope of the application of which will be indicated in the following claim.

The coated abrasives which my invention deals with may be either paper backed, cloth backed, have a backing consisting of a combination of paper and cloth, and the invention has particular utility in preserving abrasive discs in which the backing consists of fiber. The abrasive may be of any type in comminuted form. So far as the specific features of the invention are concerned, the bond holding the comminuted abrasive to the backing is chemically reactive with the atmosphere. By this I mean the ordinary natural atmosphere which includes varying amounts of moisture, a varying amount of carbon dioxide which may include the exhaust gases from industrial chimneys and the usual percentages of oxygen and nitrogen. For the manufacture of sanding discs, especially for use on portable rotary tools for the sanding of automobile bodies and other sheet metal parts, a hard vulcanized fiber disc coated with sodium silicate (water glass) in which is embedded abrasive, generally fused alumina, has been found to produce an effective abrading device for certain purposes, except for deterioration of the bond. It has been found that these discs deteriorate rapidly. I have discovered that deterioration is due to reaction of the sodium silicate with the carbon dioxide and the moisture in the air according to the following formulae:

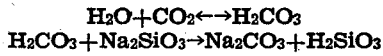

$$H_2O + CO_2 \leftrightarrows H_2CO_3$$
$$H_2CO_3 + Na_2SiO_3 \rightarrow Na_2CO_3 + H_2SiO_3$$

In the last reaction the bond is greatly weakened and the abrasive grains come out. My invention protects such discs and also other silicate bonded abrasives from the action of carbon dioxide, at least to any detrimental extent.

For the sanding of articles under water, a waterproof sandpaper is extensively employed. It has been customary to make flexible waterproof sandpaper with a bond of or containing drying oil varnishes. Such sandpaper having bonds including drying oils has been found to deteriorate when stored for prolonged periods of time. I believe this to be due to oxidation of the drying oils. The invention includes a method for the protection of waterproof sandpaper of this type.

Examples of the abrasive are fused alumina in any of its forms including electric furnace fused alumina, natural corundum and emery, also any of the hard carbides, especially silicon carbide, also any of the varieties of garnet and any of the varieties of quartz. Crushed glass, which is used to a considerable extent in certain parts of the world, may be the abrasive and, in fact, any other type of abrasive comes within the scope of the present invention.

The backing may be either of the woven or felted type or combinations of the two; that is to say, the backing may be a cloth backing or it may be of any type of paper or parchment, or vulcanized fiber or combinations of a cloth backing and a felted backing, such as paper, parchment, vulcanized fiber and the like.

For the manufacture of the coated abrasive, any known method or process may be used. For example, the sheet is customarily drawn off a roll and has the adhesive, for example sodium silicate or one of the drying oil varnishes, applied thereto by a roller and the abrasive applied thereto either by gravity or by an electrostatic field. In the manufacture of coated abrasive products in which sodium silicate is the adhesive, I carefully avoid atmospheres high in carbon dioxide. In the manufacture of waterproof sandpaper I avoid both over-drying or over-oxidation of the binder. In the manufacture of coated abrasives, it is customary to take the sheet into a drying room where it is festooned and allowed to dry for a number of hours. I avoid using combustion gases in this drying room for the silicate products (potassium silicate can be substituted for sodium silicate). In the case of the coated abrasives the adhesive of which is a varnish or similar type adhesive, I control the heat and time factors to dry and oxidize and polymerize the binder, avoiding over-drying or over-oxidation. These factors vary for the different specific varnishes employed and per se this procedure is known in the art. Also, in the case of the silicate bonded products, I prefer to dry them fairly rapidly or without any unusual delay so as to shorten the time of exposure of the bond to such quantities of carbon dioxide as may be present in the air.

I have found that reaction with carbon dioxide in the case of the silicate bonded products and oxidation in the case of the varnish bonded products can be effectively avoided by placing the product in a hermetically sealed container immediately after manufacture thereof. Any sealed container will, unless special precautions are taken, contain both oxygen and carbon dioxide, the former in greater quantities than the latter. I have found, however, that it is not necessary for achieving satisfactory commercial results to provide a special atmosphere in the container. It would be expensive to place an inert atmosphere, such as pure nitrogen, in the container prior to sealing it. Preferably I fill the container as full as possible with the coated abrasive product which should occupy 50% or more of the total volume of the container. Under such conditions some reaction between carbon dioxide and the silicate bond may be assumed to start but after a short time all of the carbon dioxide is used up. The reaction can then go no further. While such reaction as takes place is probably detrimental, it is not serious enough to affect the product greatly. Under commercial conditions, a compromise usually is made between the most perfect results and good results obtainable at a reasonable cost.

In the case of the varnish bonded abrasives, oxidation undoubtedly proceeds in the container, but after a certain period of time all the oxygen is used up. Because of the fact that atmospheric air contains a much greater quantity of oxygen than of carbon dioxide, the varnish bonded or waterproof sandpaper coated abrasive products preferably should occupy a greater percentage of the total volume of the container, for example preferably 70% or more thereof.

Where it is not desired to have the coated abrasive in the container occupy 70% or more thereof of the volume of the container or where it is impractical for the coated abrasive to occupy such volume or in any case as a preferred form of my invention, as applied to the preservation of bonds subject to deterioration by oxidation, I may process the coated abrasive to have a predetermined under-degree of oxidation in the curing operation such that subsequent cure brought about by the limited quantity of oxygen reacting to a predetermined extent with the given bond, will result in an optimum degree of cure. Due consideration must be given to the nature of the bond and the relative quantity of bond and oxygen that will be placed in the container, and since the bonds in use vary widely in nature and the quantity of oxygen in the container as compared with the quantity in the bond varies widely, no set rule can be given which will apply to all bonds and relative quantities of bonds and oxygen within the container.

For containers I prefer to use large sized cylindrical sheet metal cans. Preferably these should have a joint with a long overlap. I place the coated abrasive, in sheet, roll, disc or other form, in the can, filling the can to the extent indicated, and place the cover in position. Having put the cover on, I seal the joint, which may be done as follows: Adhesive tape is wound around the joint, overlapping so that one part is stuck to the cover and the other part is stuck to the bottom of the can. This is then brushed with molten paraffine maintained at a temperature of 100° C. Any other suitable means of sealing such containers may be used.

In the case of fiber discs coated with adhesive by means of sodium silicate bond, I prefer to use smaller cans so that when the can is opened, all of the contained discs may promptly be put to use.

The coated abrasive is now ready for shipment and will maintain its potential effectiveness despite long storage. The customer receiving the containers is instructed that he should use the material contained in each container within a few days after opening the same, preferably on the same day. In other words, the customer will keep the cans sealed until such time as more discs, for example, are needed, and will then open one can. If the customer has ten portable sanding machines, the cans may contain ten abrasive discs and all of the portable discs will have a fresh abrasive disc supplied thereto on the same day. In this way the discs will all be used up before any substantial reaction with the carbon dioxide of the air can have taken place. A similar procedure can be adopted in the case of waterproof sandpaper; for example, a plant will be known to use a certain number of dozens of sheets a day, and one or more cans can be opened each day containing substantially that number of sheets. If a fraction of the quantity in a can is saved until the second day, no great deterioration will be experienced.

As previously explained, coated abrasives are made with a cellulose backing often containing paper or paper-like material which is hygroscopic and varies widely in strength and flexibility or brittleness, according to the moisture content. The extreme brittleness of backings, brought about in waterproof sandpaper made with a varnish or resinous bond and in abrasive discs made with a backing comprising vulcanized fiber, by low moisture contents resulting from exposure to low humidities, is a serious disadvantage. Fortunately a good condition for preserving the backing is also a good condition for preserving many bonds. By this I mean that a product brought to equilibrium with a humidity range of 30 to 60% relative humidity at about 70° F. will have a backing containing an optimum amount of moisture such as will be conducive to the toughness and flexibility of the backing. Although resinous bonds and varnish bonds are not susceptible to serious changes with variations in humidity, these products are preferably brought to equilibrium with the correct humidity as a means of keeping the backing in an optimum condition for use. It should be appreciated that the correct moisture content of the backing is the important point and that the bringing of the article to equilibrium with a humidity in the range of 30 to 60% relative humidity at a temperature of about 70° F., a comfortable room temperature, is merely a preferred means of conditioning my product before it is sealed in a container. Other methods of bringing the product to the correct moisture content will occur to those skilled in the art.

In carrying out the invention, I prefer to have a controlled amount of moisture in the atmosphere in the cans. I have already mentioned that preferably the relative humidity (assuming average room temperature of 70° F.) in the can in the case of the silicate product is 50% or lower. However, some beneficial results are achieved even though no effort is made to control the amount of moisture in the can. On the other hand, I prefer that the relative humidity at 70° F. be not under 30% because both the silicate products and the varnish products, if too thoroughly dried, deteriorate. I, therefore, prefer to provide a room for the canning of the abrasive products in which the temperature and the relative humidity are controlled, and no more carbon dioxide and oxygen are present than is found in an average outdoor city atmosphere. My invention also contemplates, however, more rigidly controlling the atmosphere and includes the use of an atmosphere of a relatively inert gas such as nitrogen. This can be introduced into the cans from tanks equipped with hoses and valves. According to this procedure, the coated abrasive is placed in the can, the open end of the hose is placed in the can, and the valve turned. The cover will then be closed as much as it can be without pinching the hose and the normal atmosphere will mostly be driven out. The hose can then be quickly removed and the can promptly sealed. Such procedure will eliminate approximately 80% of the usual atmosphere and thus improve the method by further reducing either oxidation or reaction with carbon dioxide.

It will thus be seen that there has been provided by this invention a method in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

The method of preserving a flexible sheet abrasive material coated with a layer of abrasive by an adhesive bond which will react chemically with a constituent of ordinary air, i. e. with oxygen in the case of drying oils and varnish bonds and with carbon dioxide in the case of silicate bonds, which consists in providing an atmosphere of between 30% and 60% relative humidity, placing the flexible sheet abrasive material in said atmosphere until it comes to equilibrium therewith in its moisture content, then placing said material in a container having an atmosphere of such humidity and of a size that not less than 50% of the space in the container is occupied by the flexible sheet abrasive material, sealing the container, the container containing not enough oxygen or carbon dioxide detrimentally to affect the material beyond a permissive amount, and maintaining said atmosphere in said container, and keeping the material in said container until it is to be used.

FRANK J. CRUPI.